A. SANBURN.
Bee Hive.
No. 3,972.  Patented March 26, 1845.
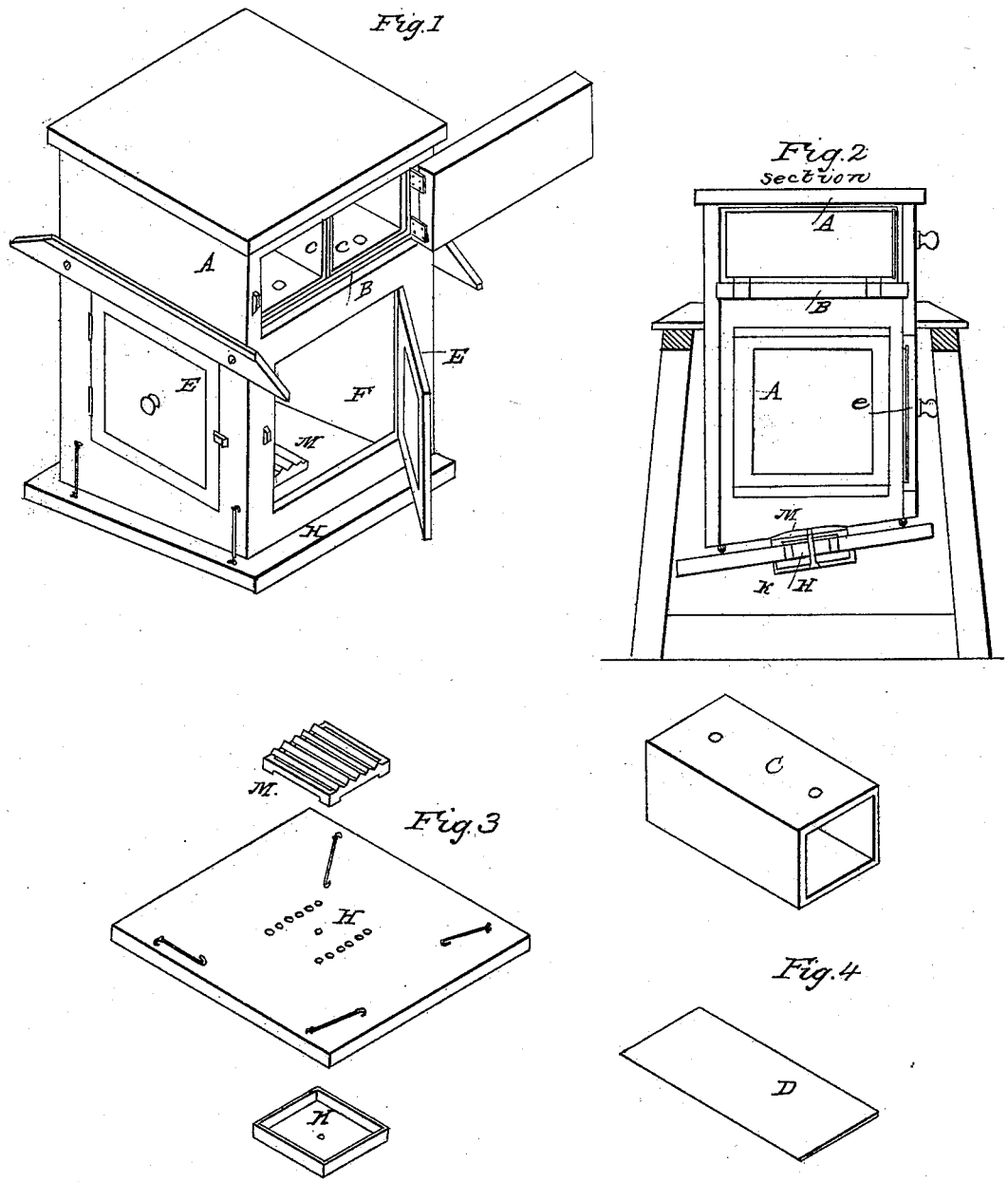

UNITED STATES PATENT OFFICE.

ABRAHAM SANBURN, OF CARTHAGE, OHIO.

BEEHIVE.

Specification forming part of Letters Patent No. 3,972, dated March 26, 1845; Reissued February 13, 1849, No. 128.

*To all whom it may concern:*

Be it known that I, ABRAHAM SANBURN, of Carthage, in the county of Hamilton and State of Ohio, have invented a new and useful Hive for Bees; and I do hereby declare that the following is a full and exact description of the construction and operation of the same, reference being had to the annexed drawings, making a part of this specification, in which—

Figure 1 is a perspective view. Fig. 2 is a vertical section. Fig. 3 exhibits the trap or harbor in detail and Fig. 4 one of the reserve drawers.

The nature of my invention consists in providing an artificial harbor for the beemoth or miller, of such a nature, as effectually to preserve the honeycomb from the ravages of that destructive insect. Also in providing means for observing those actions of the queen bee, &c., which have heretofore been deemed a mystery.

The hive consists of the following parts viz: A rectangular box (A) twelve inches square inside, open at bottom. Five inches from the top is an inch partition (B) pierced with four holes to correspond with similar holes in the drawers (C) which drawers are made to slide freely in the upper compartment. One of the drawers is shown bottom upward in Fig. 4 and also the piece of tin (D) used to cut off connection between the upper and lower compartment previous to taking out the drawer. In three sides of the hive are doors (E) the openings of which (F) are closed by glass. These doors may have mirrors on the inside to enable the apiarian to watch those transactions of the queen bee which she will not perform when conscious of observation.

(H), Fig. 2, is a vertical section of the trap or harbor, showing its position beneath the hive, from which it is suspended by four small hooks. The three pieces of this trap are shown separate in Fig. 3, and are united together by one screw passing through the tray (K) and slab (H) and screwing into the wooden grating (M), so as to place the grating over the holes in the slab, and the tray under them.

Operation: The moths or millers alight on the bottom board, and instinctively seek shelter under the grating, where the bees cannot come; here, food being placed for them they remain and germinate, and, in say a week or so, will be found congregated in considerable numbers. The trap is then unhitched from the hive, scalded, or cleaned out, resupplied with bait and replaced.

When making observations with the mirror it is desirable to hold before the face a piece of tin or some such thing having a small opening in it to look through.

What I claim as original, is—

The combination of the moth trap or harbor K before described with the suspended hive A constructed and arranged in the manner set forth.

A. SANBURN.

Witnesses:
 WM. P. ELLIOTT,
 JNO. L. BUSH.

[FIRST PRINTED 1913.]